A. C. SWEENEY & W. R. PARKS.
CONFECTION REFRIGERATOR.
APPLICATION FILED APR. 7, 1910.

1,033,488.

Patented July 23, 1912.

3 SHEETS—SHEET 1.

A. C. SWEENEY & W. R. PARKS.
CONFECTION REFRIGERATOR.
APPLICATION FILED APR. 7, 1910.

1,033,488.

Patented July 23, 1912.

3 SHEETS—SHEET 2.

A. C. SWEENEY & W. R. PARKS.
CONFECTION REFRIGERATOR.
APPLICATION FILED APR. 7, 1910.
1,033,488.
Patented July 23, 1912.
3 SHEETS—SHEET 3.
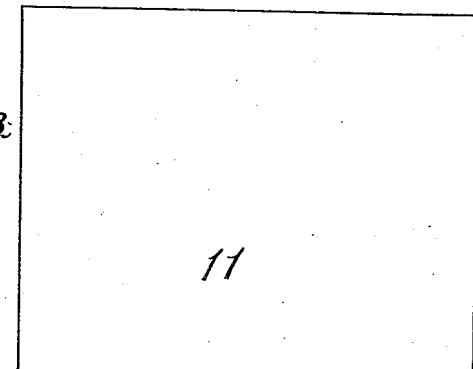
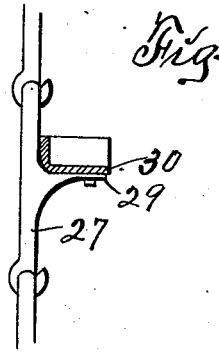
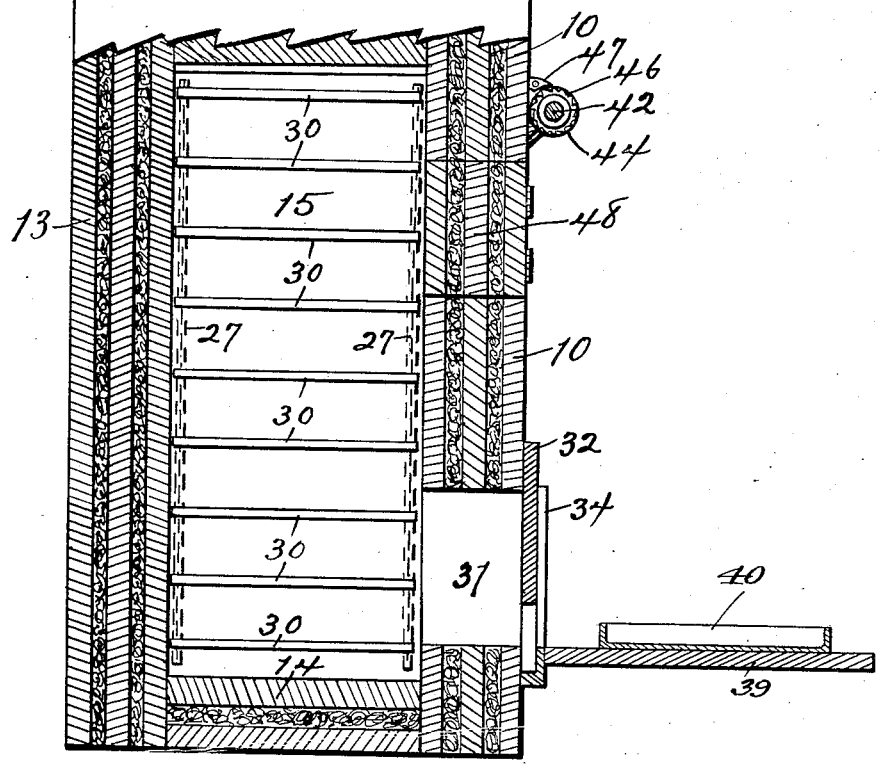

UNITED STATES PATENT OFFICE.

ANNA CECILIA SWEENEY AND WILLIS RAY PARKS, OF OTTUMWA, IOWA.

CONFECTION-REFRIGERATOR.

1,033,488.  Specification of Letters Patent.  Patented July 23, 1912.

Application filed April 7, 1910. Serial No. 554,065.

*To all whom it may concern:*

Be it known that we, ANNA C. SWEENEY and WILLIS R. PARKS, citizens of the United States, residing at Ottumwa, in the county of Wapello and State of Iowa, have invented a new and useful Confection-Refrigerator, of which the following is a specification.

The object of this invention is to provide an improved construction for a refrigerator for confections and one that is especially adapted to receive and cool dipped chocolates or chocolate covered candies.

A further object of this invention is to provide improved means for moving and carrying trays of confectionery through a cooling chamber.

Our invention consists in the construction, arrangement and combination of elements hereinafter set forth, pointed out in our claim and illustrated by the accompanying drawing, in which—

Figure 1:
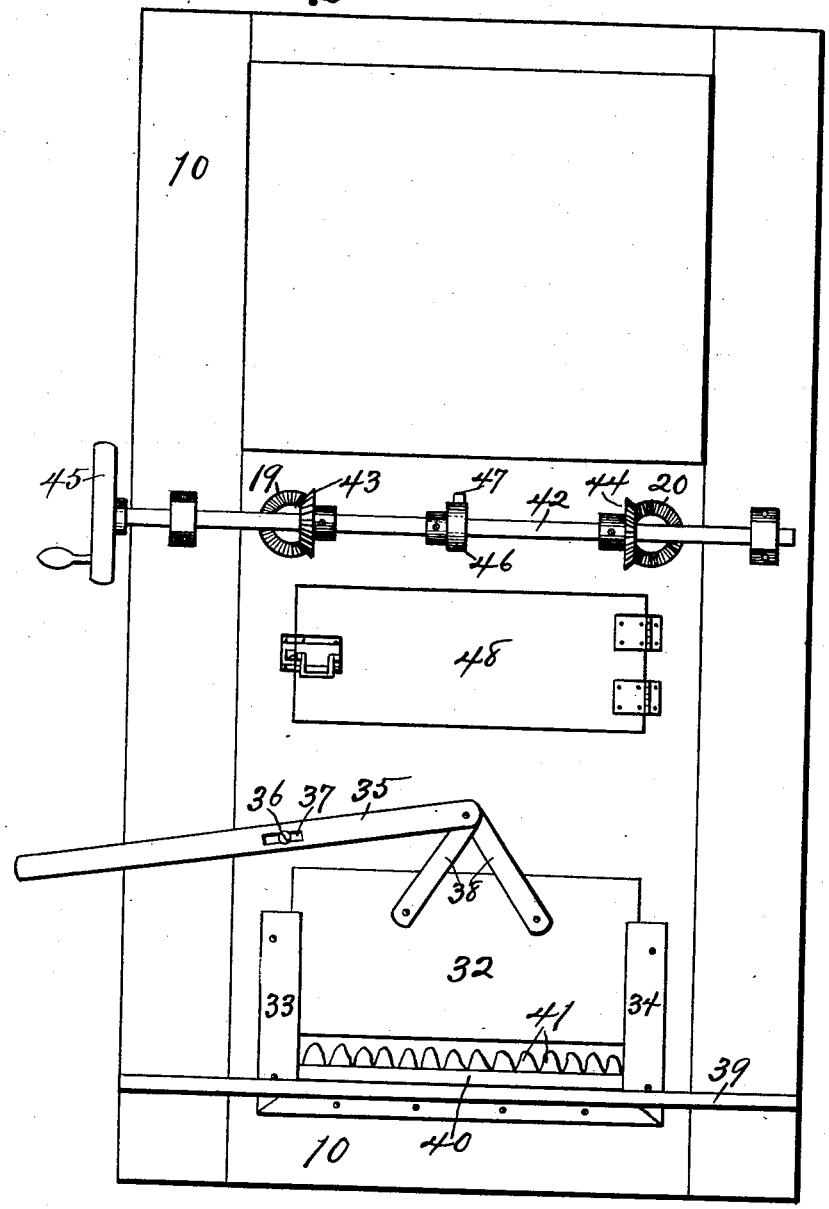
Figure 2:
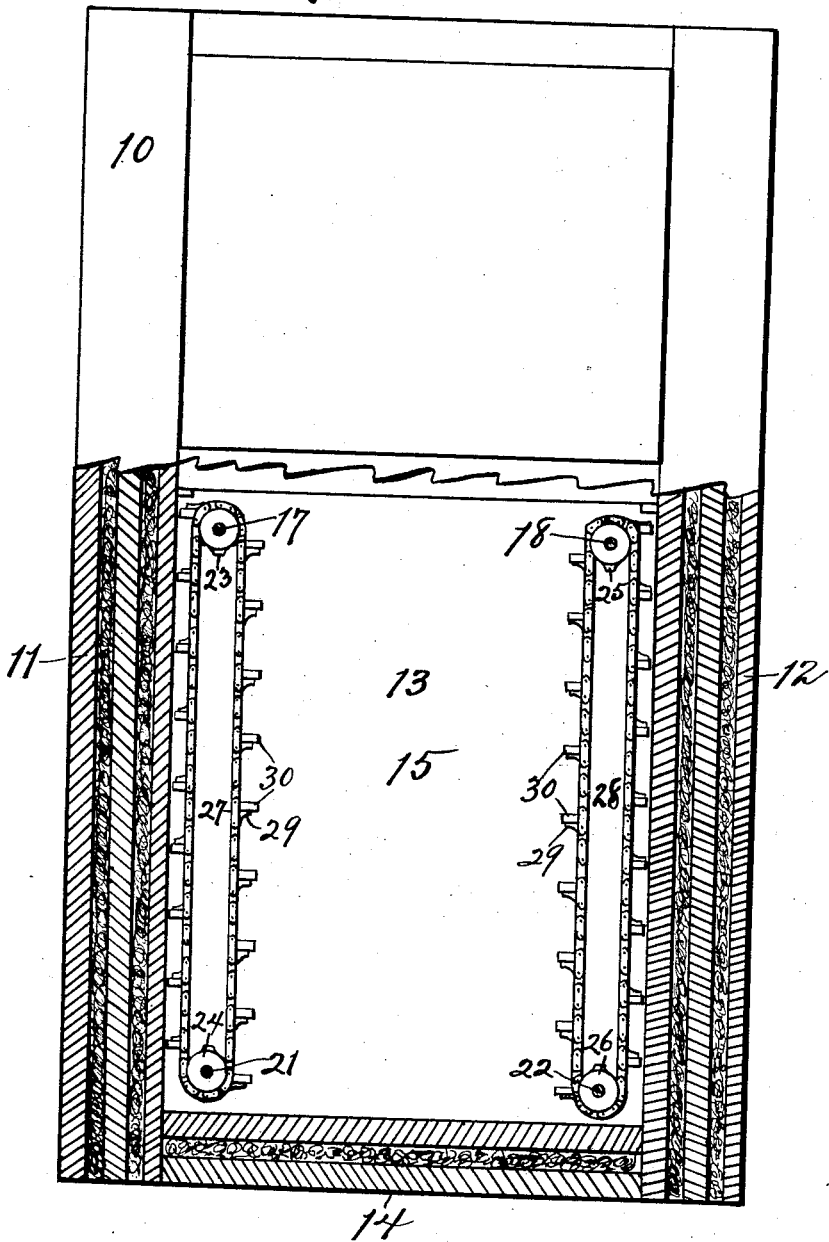

Figure 1 is a front elevation of the complete device. Fig. 2 is a front elevation of the device, partly in section to illustrate the interior construction. Fig. 3 is an end elevation of the device, partly in section to illustrate the interior construction. Fig. 4 is a detail vertical section of one of the carriers.

The device as shown is constructed with a front wall 10, end walls, 11, 12, a rear wall 13, a bottom 14 and a suitable top inclosing and insulating a cooling chamber 15 and an ice chamber above said cooling chamber and separated therefrom in any suitable manner. A door 16 of any desired construction provides access to the ice chamber. The currents of air around, through and between the ice chamber and cooling chamber may be provided in any desired and suitable manner, and such does not constitute any part of our present invention. Shafts 17, 18 are mounted transversely of the upper portion of the cooling chamber 15 and are journaled in bearings in the front wall 10 and rear wall 13. The shafts 17, 18 extend outside the front wall 10 and are provided on their outer ends with bevel gears 19, 20. Idler shafts 21, 22 extend transversely of the lower portion of the cooling chamber 15 and are journaled in bearings on the front wall 10 and rear wall 13. Sprocket wheels 23, 24 are mounted on the shafts 17, 21, and sprocket wheels 25, 26 are mounted on the shafts 18, 22. Endless chains 27 connect the sprocket wheels 23, 24 and are arranged in vertical positions at the front and rear portions of the cooling chamber 15. Endless chains 28 connect the sprocket wheels 25, 26 and are arranged in vertical positions in the front and rear portions of the cooling chamber 15. Some of the links of each chain are provided with lugs 29 and carriers or shelves 30 are mounted on and fixed to said lugs and arranged in horizontal positions and spaced apart throughout the length of the chains. The carriers 30 or shelves on the chain 27 are arranged opposite to those on the chain 28. Each of the carriers or shelves preferably is formed of sheet metal of generally rectangular shape and open at one side (the inner side).

A doorway 31 is formed in the lower portion of the front wall 10 of the refrigerator and is closable by a door 32 slidingly mounted in cleats 33, 34 on the outer face of said wall.

A lever 35 is provided and is fulcrumed on a pin 36 projecting outward from the front wall 10 and extending through a slot 37 in the central portion of said lever. The inner end portion of the lever 35 is pivoted to arms 38 fixed to and converging above the door 32. The lever 35 is adapted for manual actuation to raise and lower the door 32.

A shelf or table 39 is mounted on and extends outwardly from the wall 10 at the lower portion of the doorway 31 and said shelf or table may be employed to support a tray, board or pan 40 containing confections or candies 41 to be cooled. When the tray, board or pan 40 is filled with the confections or candies to be cooled the door 32 is raised manually and said tray, board or pan is moved inward through the door 31 and upon two of the carriers 30. Then the door 32 may be closed until another tray, board or pan 40 is ready for introduction to the refrigerator.

A shaft 42 is journaled in bearings on the outer face of the wall 10 and is provided with bevel gears 43, 44 meshing with the gears 19, 20. A crank wheel 45 is fixed to one end of the shaft 42 and a ratchet wheel 46 is fixed to the central portion of said shaft and is adapted to be engaged by a pawl or detent 47 pivoted on the front wall 10. As succeeding trays, boards or pans 40 are prepared for introduction to the refrigerator, the shaft 42 is manually rotated by means of the crank wheel 45 and in turn rotates the shafts 17 and 18 and raises the inner portions of the endless chains 27, 28. In the ascent of the inner portions of the endless chains 27, 28 the carriers 30 thereon raise the trays previously placed on them and bring into position for occupancy successive carriers. The door 32 is manually opened, a tray is introduced to and upon a pair of carriers, the door is closed, another tray is prepared, the first tray is raised sufficiently to bring another pair of carriers into proper position and another tray is placed in like manner. These movements are repeated until the cooling chamber is supplied to its capacity with trays of confectionery or candies.

A door 48 gives access to the upper portion of the cooling chamber 15 and said door may be opened from time to time for the removal of trays 40 from the carriers 30 in said cooling chamber. The cooling chamber is of such capacity that it will effectually cool the candies and confections contained therein before it is entirely filled, as above described, and thereafter trays may be successively removed from the top of the chamber as trays are successively introduced at the bottom.

We claim as our invention—

In a confection refrigerator formed with a cooling chamber having ingress and egress openings one above the other, endless carriers mounted for vertical travel and spaced apart in said cooling chamber, shafts of said carriers extending outside said cooling chamber above said openings, a countershaft extending across the front of the cooling chamber above said openings, gear connections between said shafts, ratchet and pawl devices acting on the countershaft, and manually operated means for rotating said countershaft.

ANNA CECILIA SWEENEY.
WILLIS RAY PARKS.

Witnesses:
 J. J. SMITH,
 C. E. BOUDE.

---

Copies of this patent may be obtained for five cents each, by addressing the "Commissioner of Patents, Washington, D. C."